(12) United States Patent
Liu

(10) Patent No.: US 7,165,854 B1
(45) Date of Patent: Jan. 23, 2007

(54) REFLECTING MIRROR AND ITS FABRICATION METHOD

(76) Inventor: Cheng-Shun Liu, 1F., No. 3, Lane 220, Hsieh Chen Rd., Sanhsia Chen, Taipei Hsien (TW)

( * ) Notice: Subject to any disclaimer, the term of this patent is extended or adjusted under 35 U.S.C. 154(b) by 0 days.

(21) Appl. No.: 11/266,274

(22) Filed: Nov. 4, 2005

(51) Int. Cl.
  *G02B 7/82* (2006.01)
  *A47F 1/14* (2006.01)
(52) U.S. Cl. ............... 359/871; 359/900; 248/466
(58) Field of Classification Search ............ 359/900
  See application file for complete search history.

(56) References Cited

U.S. PATENT DOCUMENTS 1,537,039 A * 5/1925 Short ............... 248/483
3,942,880 A * 3/1976 Zeiders, Jr. ............ 359/845
5,909,327 A * 6/1999 Liu ....................... 359/872
6,937,394 B2 * 8/2005 Labus ..................... 359/499

* cited by examiner

*Primary Examiner*—Drew A. Dunn
*Assistant Examiner*—Aline D. McNaull
(74) *Attorney, Agent, or Firm*—Troxell Law Office, PLLC

(57) ABSTRACT

A reflecting mirror fabrication method, which includes the steps of (a) stamping a steel plate into a back panel, which has a rib-reinforced base, a rim extending around the rib-reinforced base, (b) installing nuts in the back side of the back panel for mounting, (c) stamping a steel plate into a mirror, which has a rounded base, a rim extending around the rounded base, and an annular connected between the rounded base and the rim, and (d) roller ramming the rim of the back panel into a scrolled holding down rim portion to affix the rim of the mirror to the rim of the back panel.

7 Claims, 19 Drawing Sheets

REFLECTING MIRROR AND ITS FABRICATION METHOD

BACKGROUND AND SUMMARY OF THE INVENTION

The present invention relates to the manufacturing of a reflecting mirror and more particularly to a reflecting mirror fabrication method, which saves much labor and manufacturing time and, is practical to provide a safety reflecting mirror.

U.S. Pat. No. 5,909,327 discloses a reflecting mirror entitled "convex lens assembly", which uses a plastic a back board to hold a convex lens. This structure of reflecting mirror is functional, however it is not environmentally protective because of the use of a plastic material.

FIGS. 1~6 show the fabrication of another design of reflecting mirror according to the prior art. According to this design, a galvanized steel plate and a stainless steel plate are respectively processed into a back panel 7 (see FIG. 1) and a mirror 8 (see FIG. 2). After the formation of the back panel 7, nuts 74 are fixedly fastened to the back side of the back panel 7 (see FIG. 3), and a visor 85 is fixedly fastened to the mirror 8 (see FIG. 4). Thereafter, the back panel 7 and the mirror 8 are fixedly fastened together by spot welding (see FIG. 5), and then a polyvinyl chloride packing member 80 is fastened to the periphery of the assembly of the back panel 7 and the mirror 8, thereby forming the desired finished product 9 (see FIG. 6). This design of reflecting mirror has drawbacks as follows:

1. The use of the packing member 80 greatly complicates the manufacturing process of the reflecting mirror, and the peripheral edge 731 of the rim 73 of the back panel 7 or the peripheral edge 831 of the rim 83 of the mirror 8 may injure the worker accidentally.
2. The employment of spot welding to fixedly fasten the back panel 7 and the mirror 8 together and the use of the plastic packing member 80 are not in conformity with the spirit of environment protection.
3. The plastic packing member 80 becomes aged quickly under the radiation of the light of the sun. When aged, the plastic packing member 80 may fall from the reflecting mirror 9. At this time, the peripheral edge 731 of the rim 73 of the back panel 7 or the peripheral edge 831 of the rim 83 of the mirror 8 may injure any person who touches the peripheral edge 731 of the rim 73 of the back panel 7 or the peripheral edge 831 of the rim 83 of the mirror 8 accidentally.

The present invention has been accomplished under the circumstances in view. It is therefore one object of the present invention to provide a reflecting mirror fabrication method, which is practical to make a safety reflecting mirror that does not injure any person who touches the peripheral edge of the reflecting mirror accidentally. It is another object of the present invention to provide a reflecting mirror fabrication method, which saves much labor and manufacturing time. It is still another object of the present invention to provide a reflecting mirror fabrication method, which eliminates the use of any plastic materials To achieve these and other objects of the present invention, the reflecting mirror fabrication method comprises the steps of (a) stamping a steel plate into a back panel, which has a rib-reinforced base, a rim extending around the rib-reinforced base, and an annular step and connected between the base and the rim, (b) installing nuts in the back side of the back panel for mounting, (c) stamping a steel plate into a mirror, which has a rounded base, a rim extending around the rounded base, and an annular connected between the rounded base and the rim, and (d) roller ramming the rim of the back panel into a scrolled holding down rim portion to affix the rim of the mirror to the rim of the back panel.

DETAILED DESCRIPTION OF THE INVENTION

Figure 1:
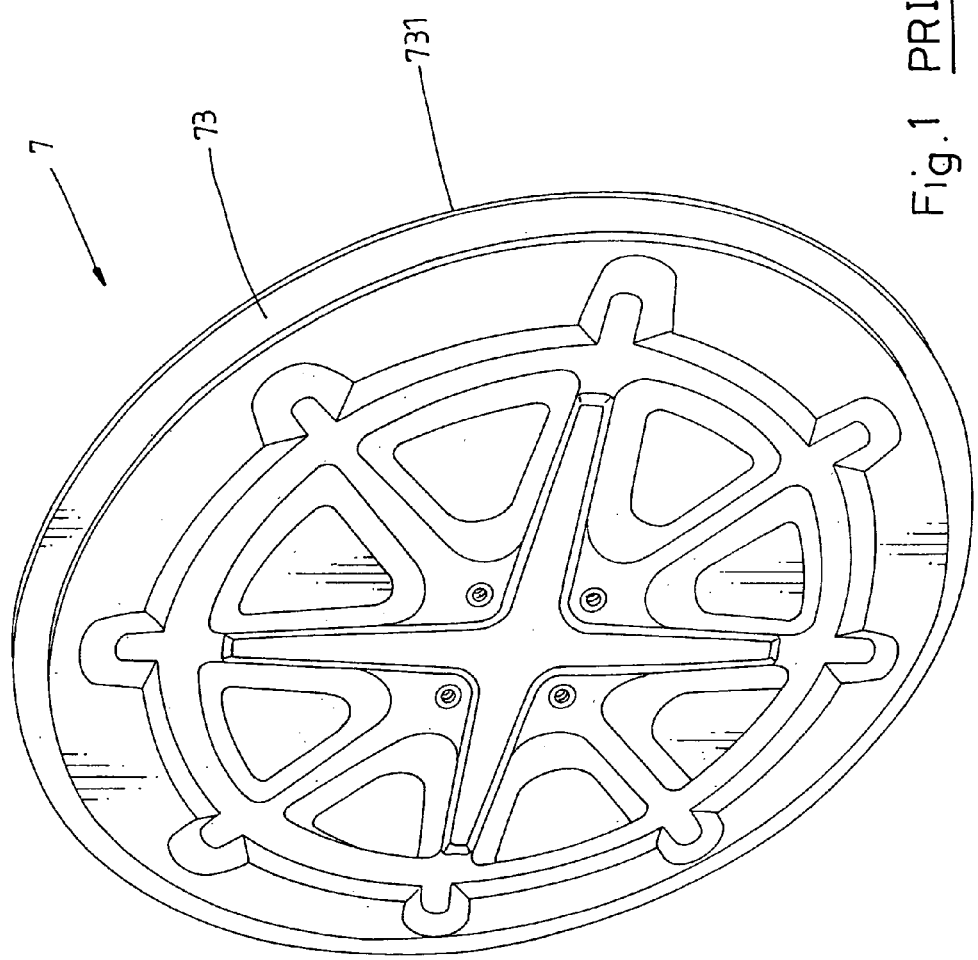
FIG. 1 is an elevational view of a back panel made according to a conventional reflecting mirror fabrication method.
Figure 2:
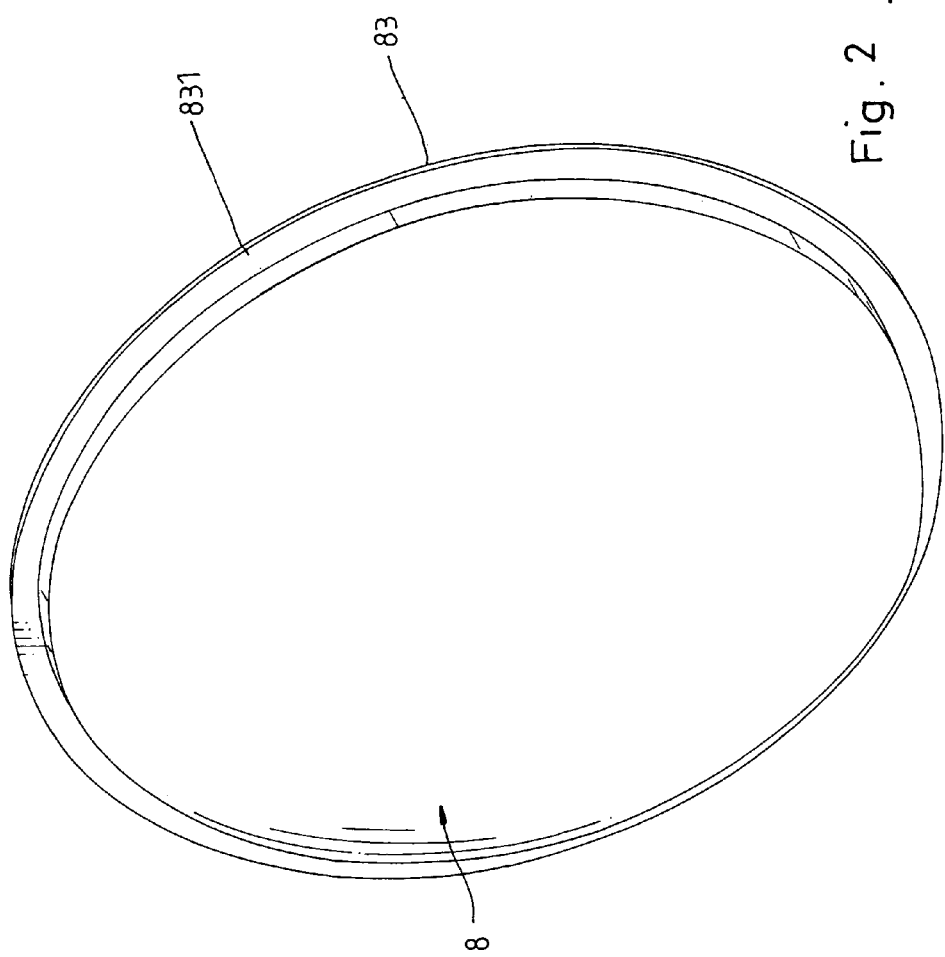
FIG. 2 is an elevational view of mirror made according to the conventional reflecting mirror fabrication method.
Figure 3:
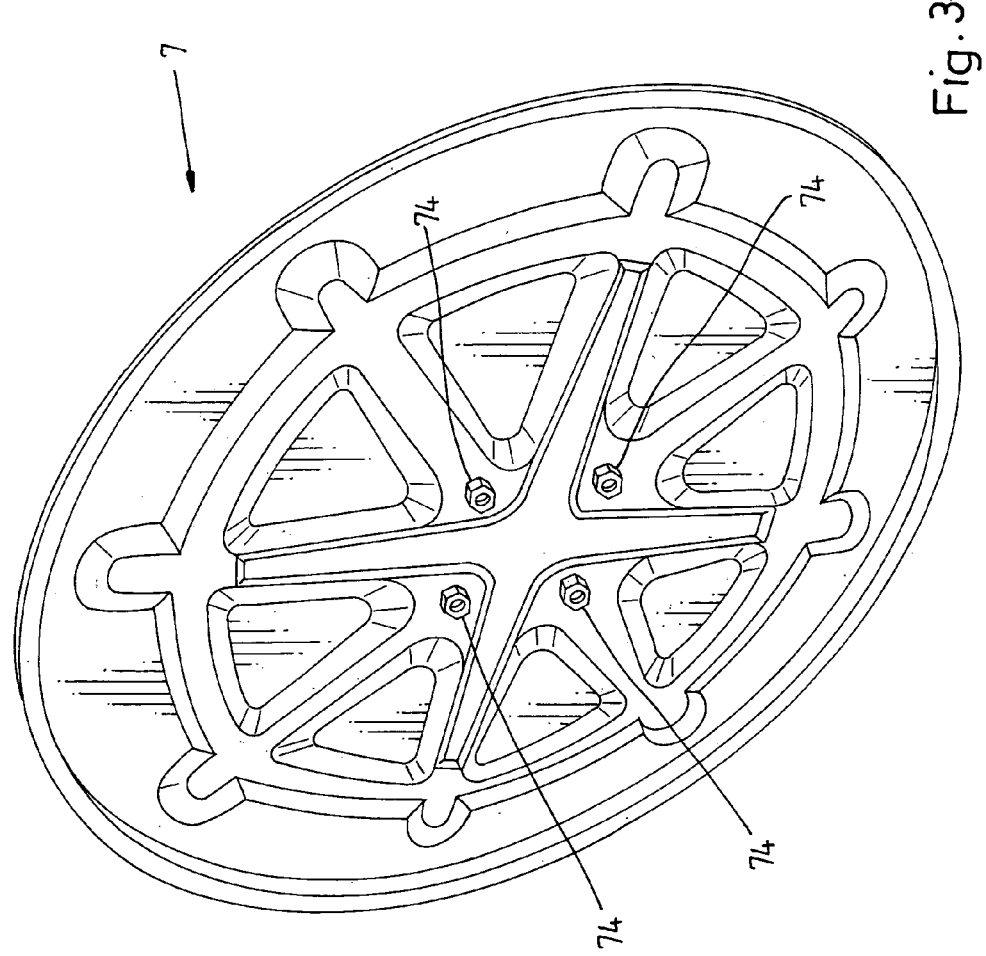
FIG. 3 is a back side view of the back panel shown in FIG. 1.
Figure 4:
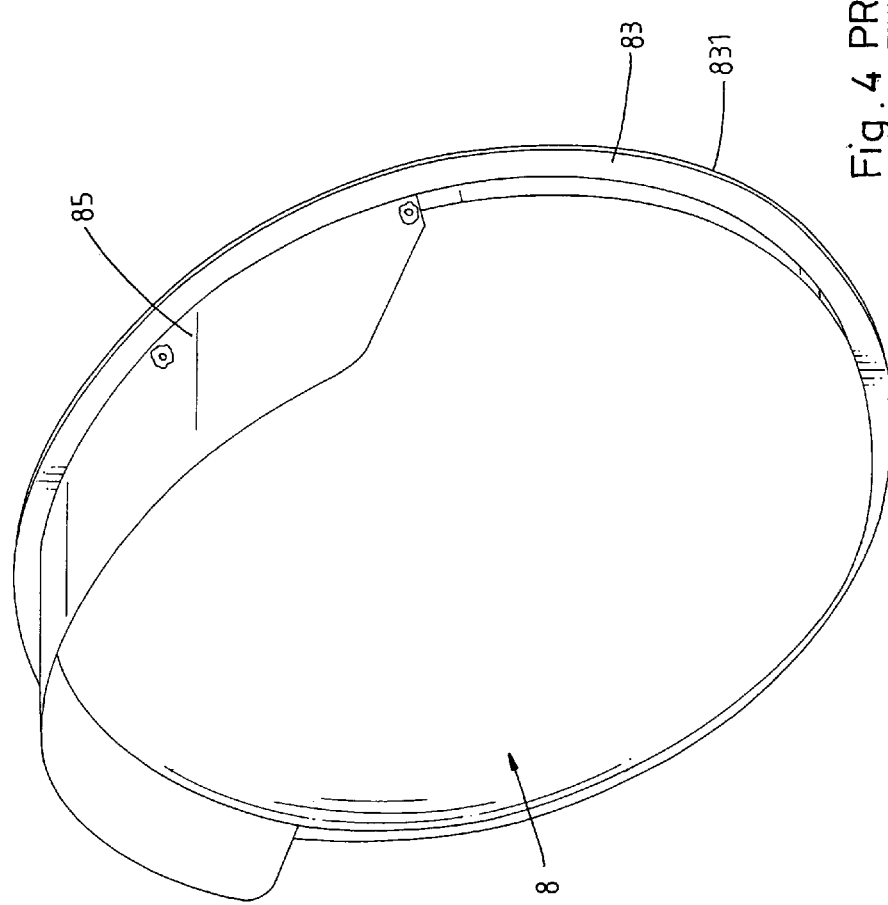
FIG. 4 corresponds to FIG. 2, showing a visor fastened to the mirror.
Figure 5:
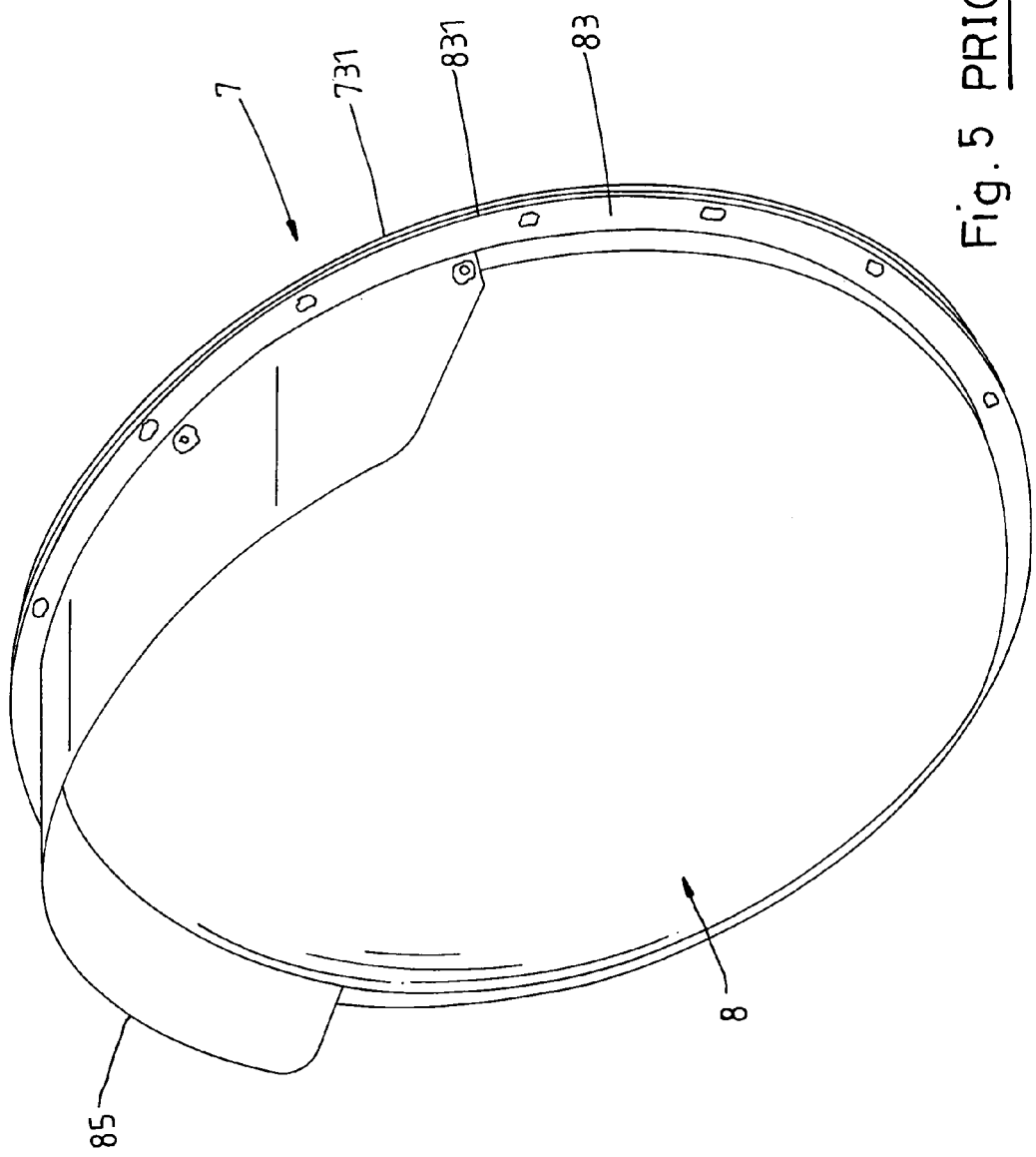
FIG. 5 is an elevational view showing the mirror fixedly fastened to the back panel according to the prior art.
Figure 6:
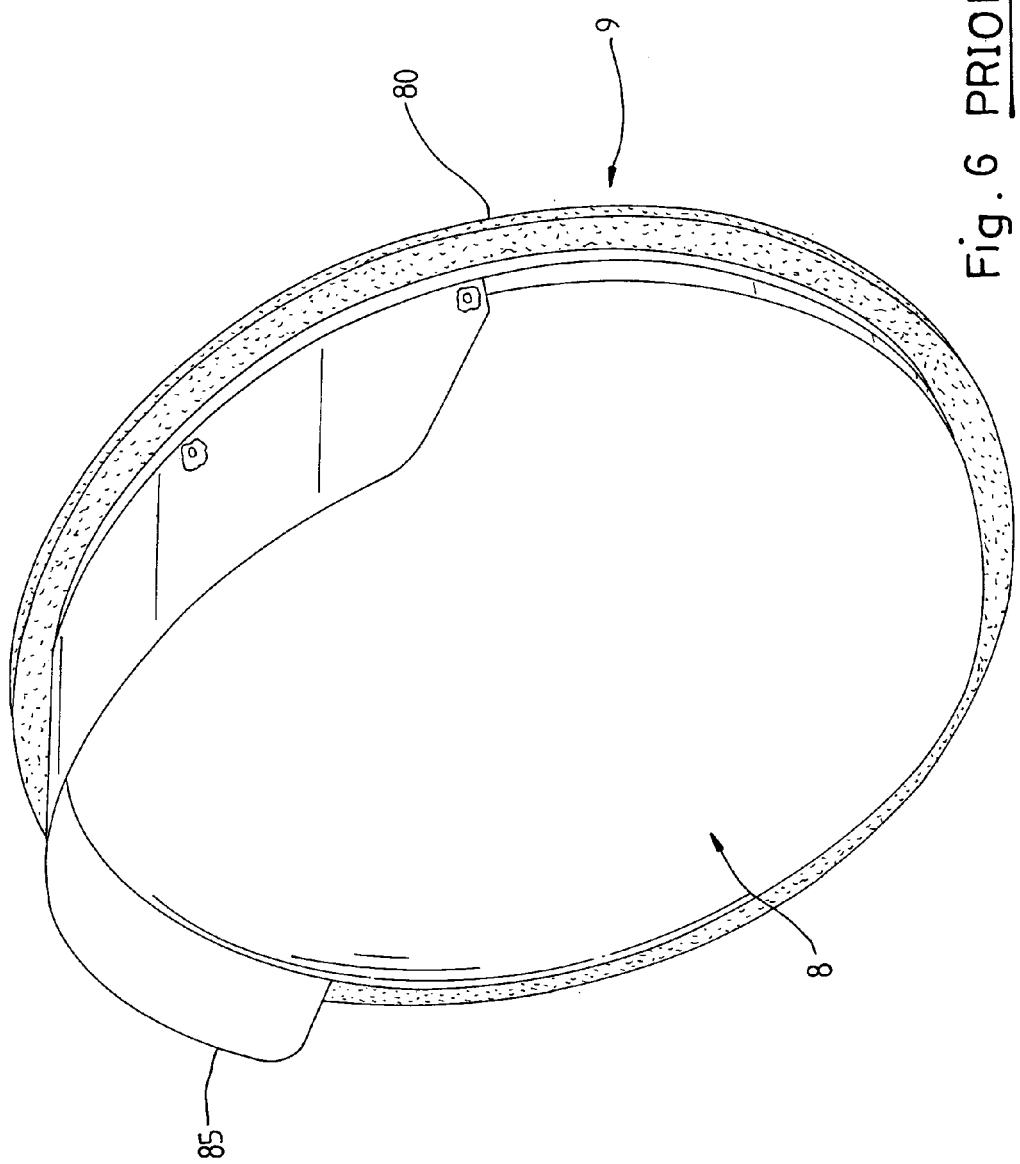
FIG. 6 is an elevational view of a finished reflecting mirror made according to the prior art.
Figure 7:
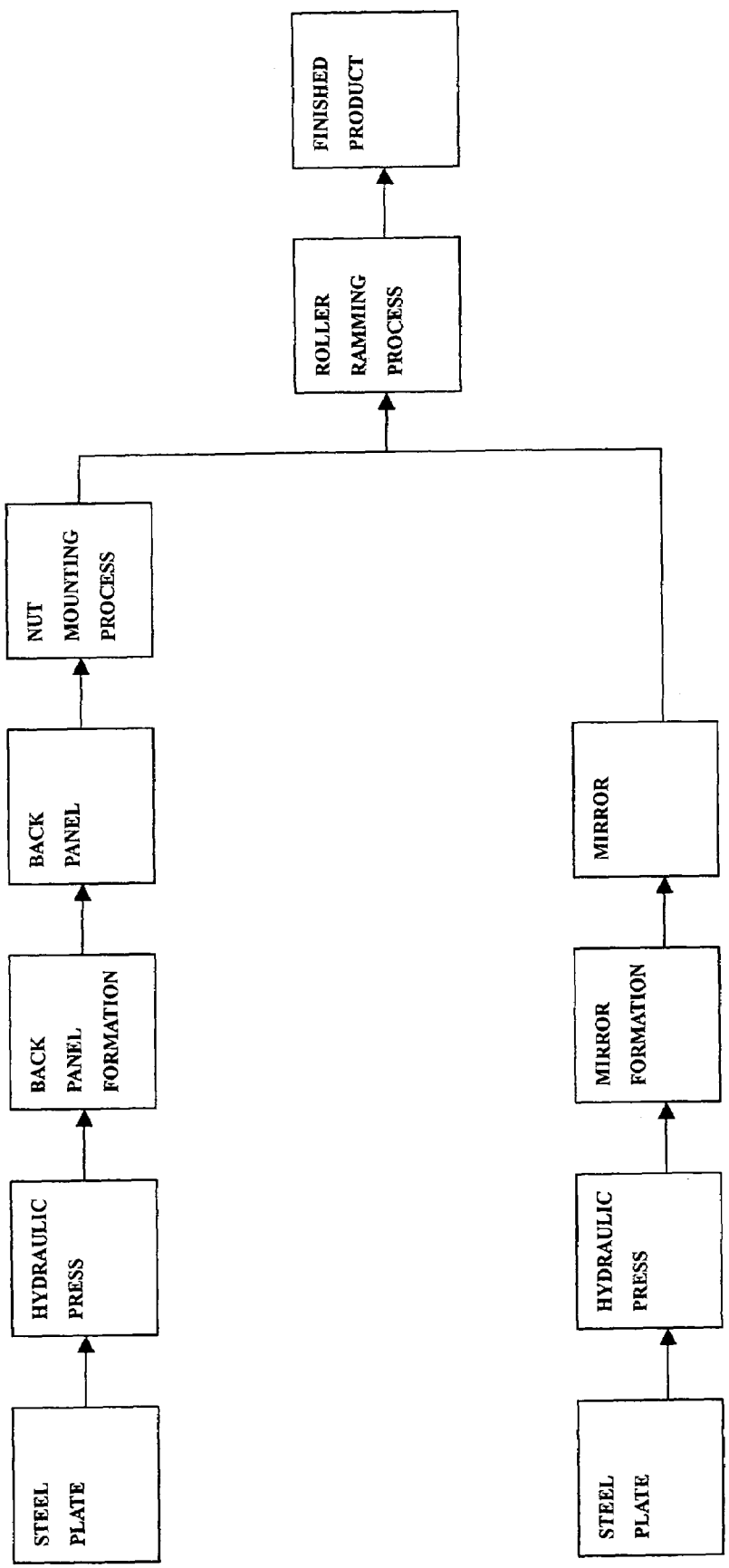
FIG. 7 is a block diagram showing the manufacturing flow of a reflecting mirror fabrication method according to the present invention.
Figure 8:
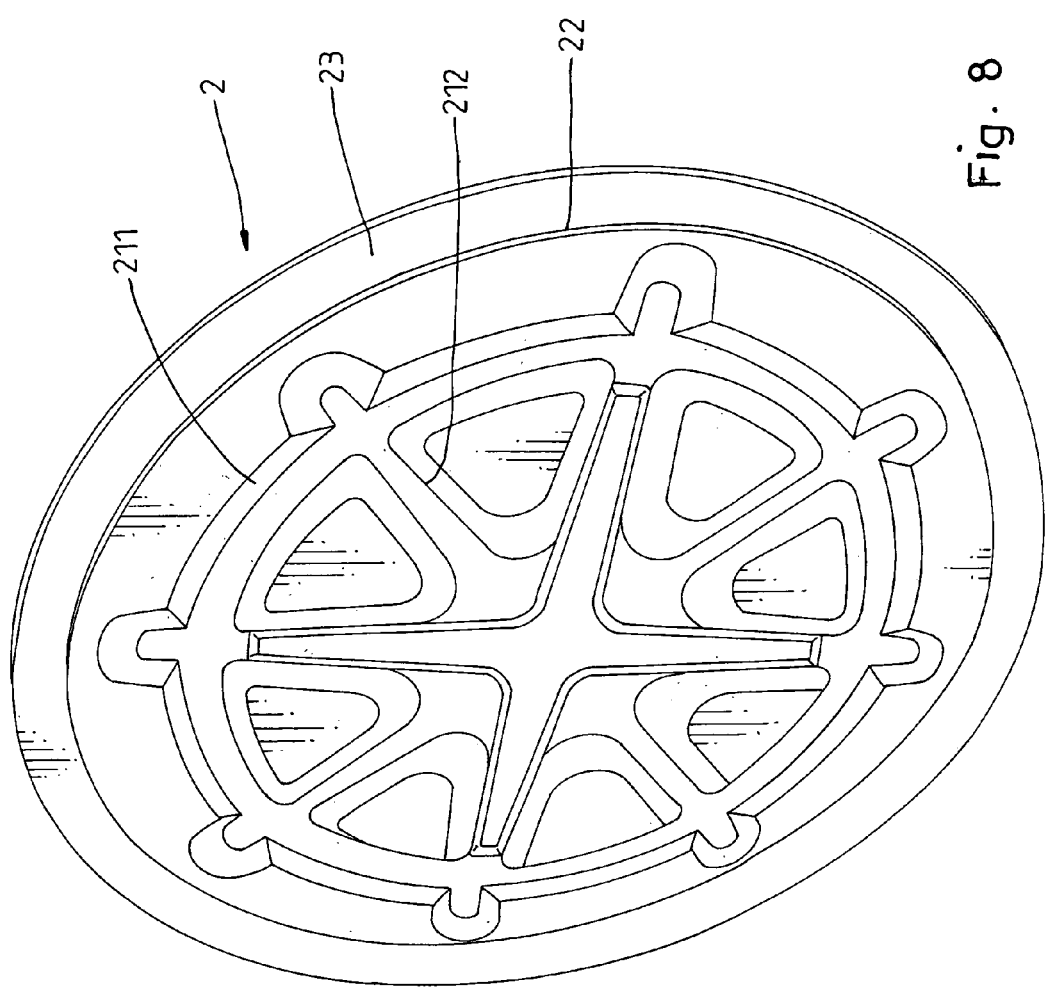
FIG. 8 is an elevational view a back panel made according to the reflecting mirror fabrication method of the present invention.
Figure 9:
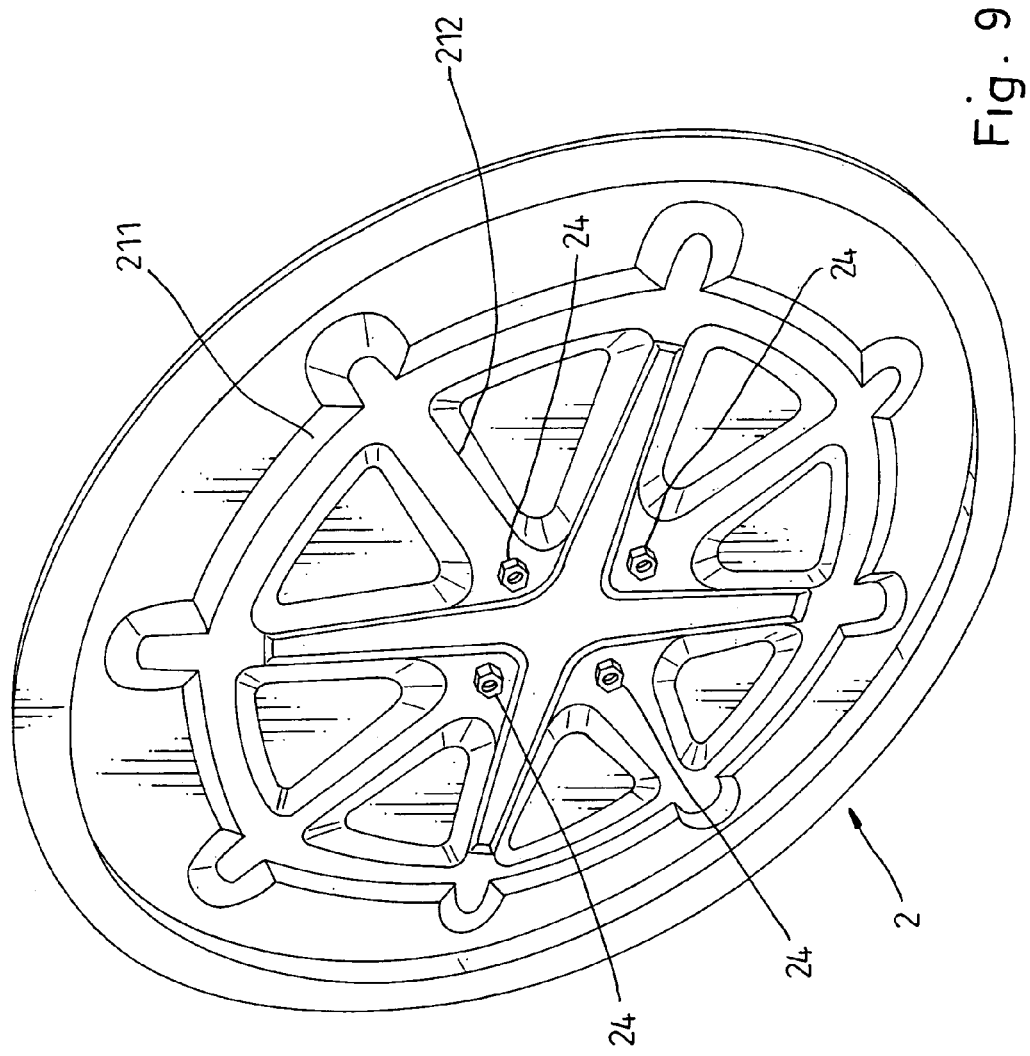
FIG. 9 corresponding to FIG. 8, showing screw nuts welded to the back side of the back panel according to the present invention.
Figure 10:
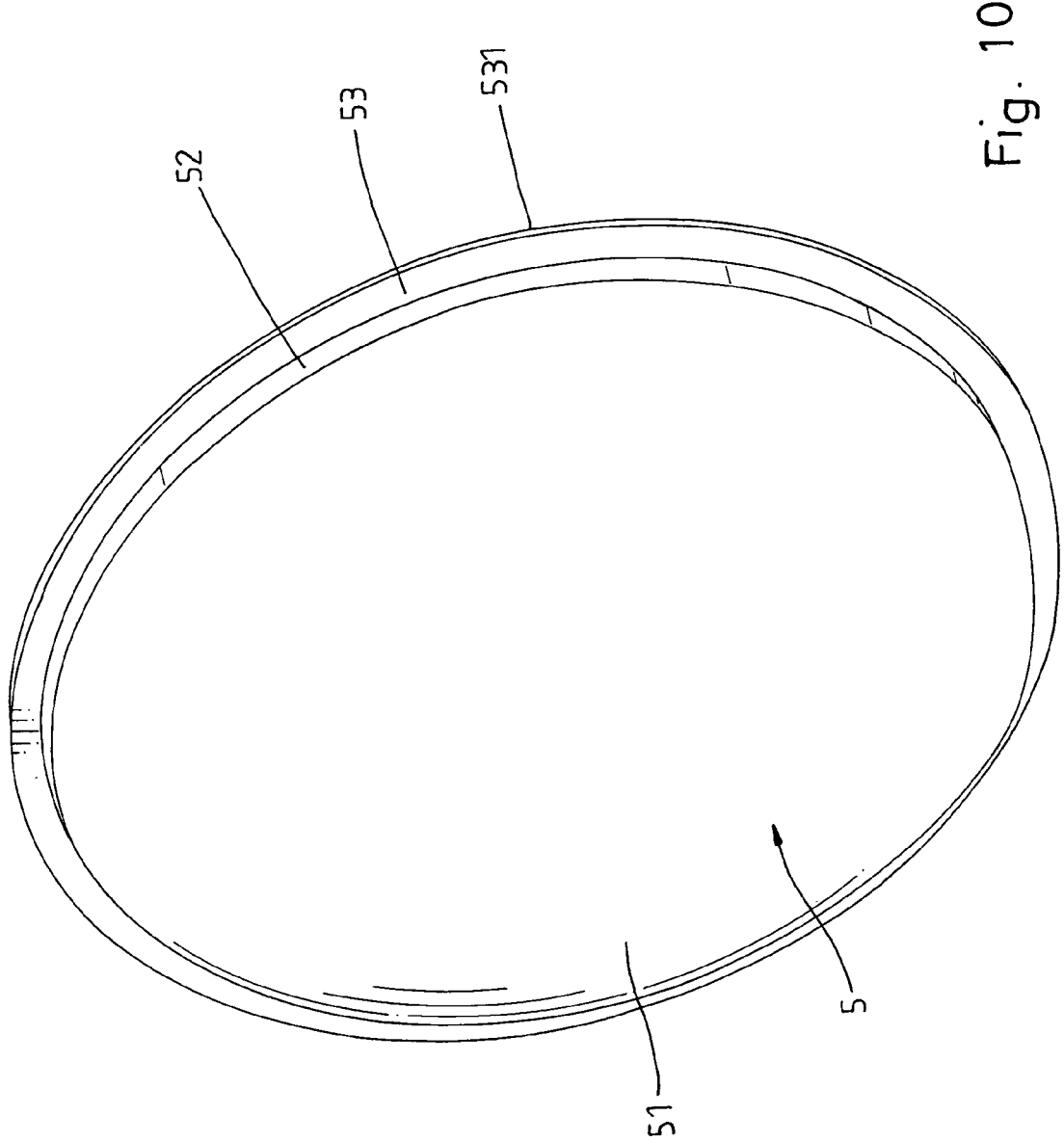
FIG. 10 is an elevational view of a mirror made according to the reflecting mirror fabrication method of the present invention.
Figure 11:
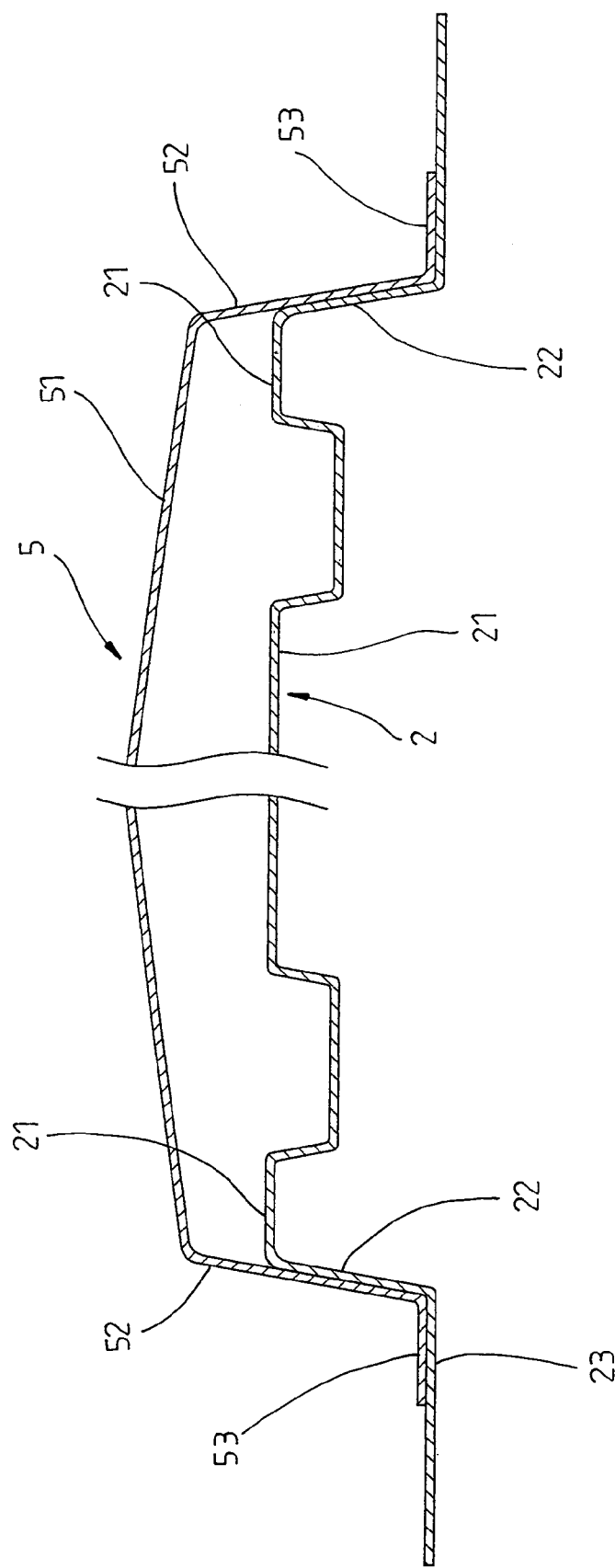
FIG. 11 is schematic sectional view showing the mirror and the back panel attached together before roller ramming process according to the present invention.
Figure 12:
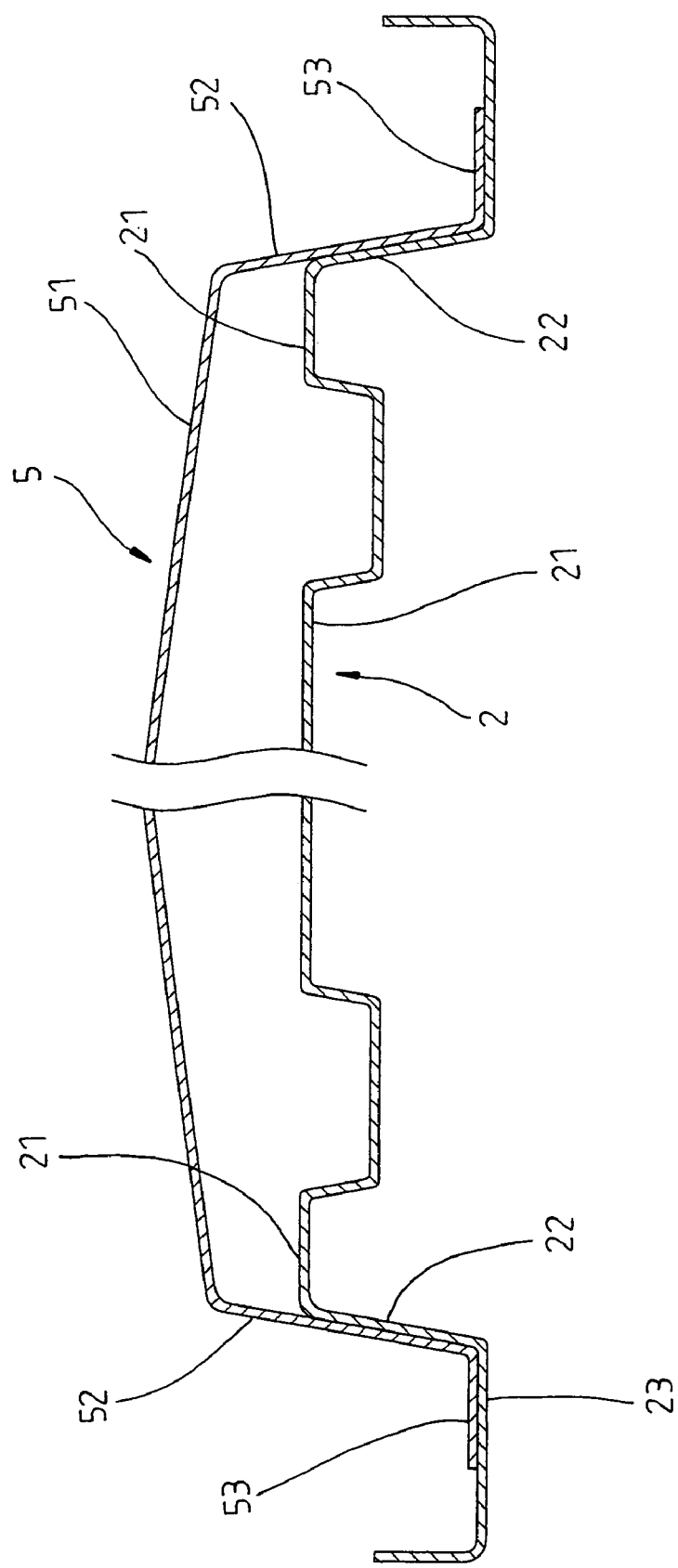
FIG. 12 is similar to FIG. 11 but showing the status of the rim of the back panel after processed through the first roller ramming mechanism.
Figure 13:
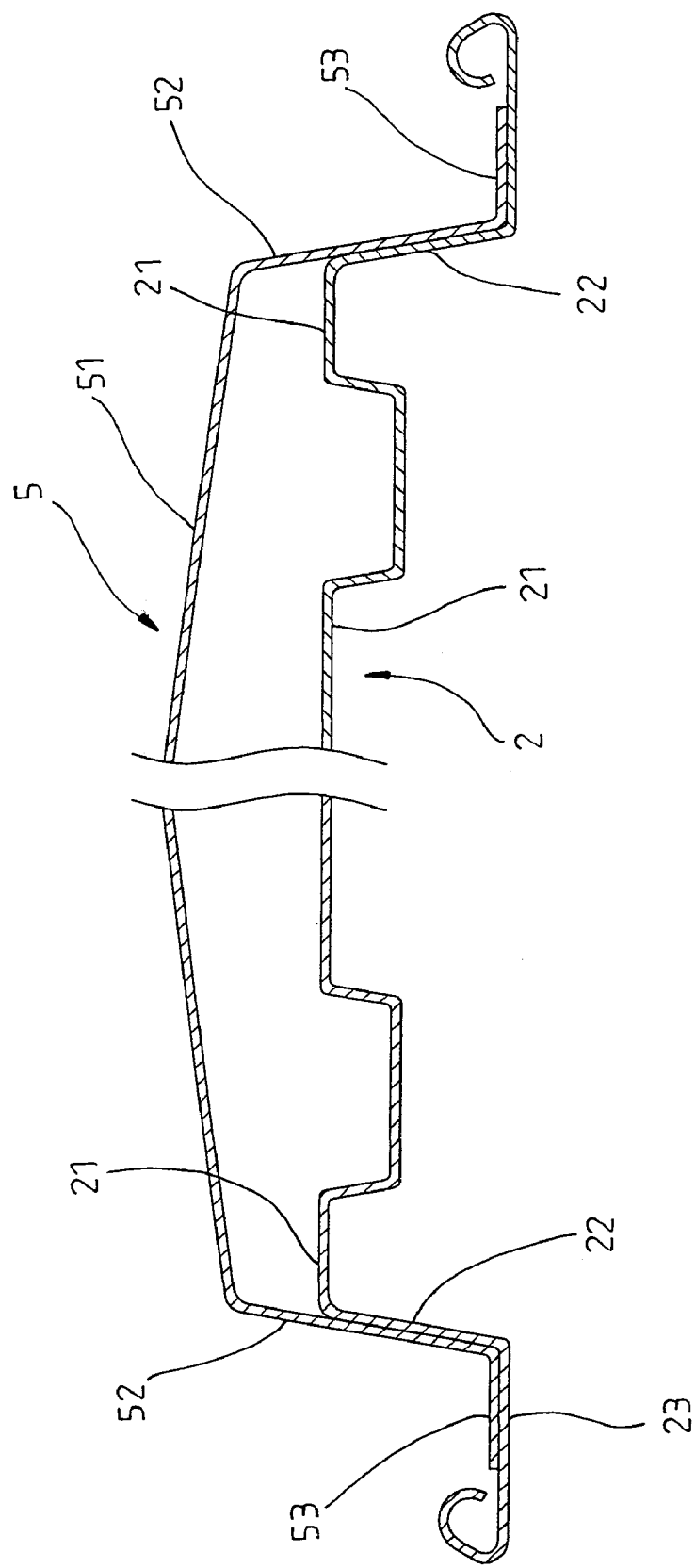
FIG. 13 is similar to FIG. 12 but showing the status of the rim of the back panel after processed through the second roller ramming mechanism.
Figure 14:
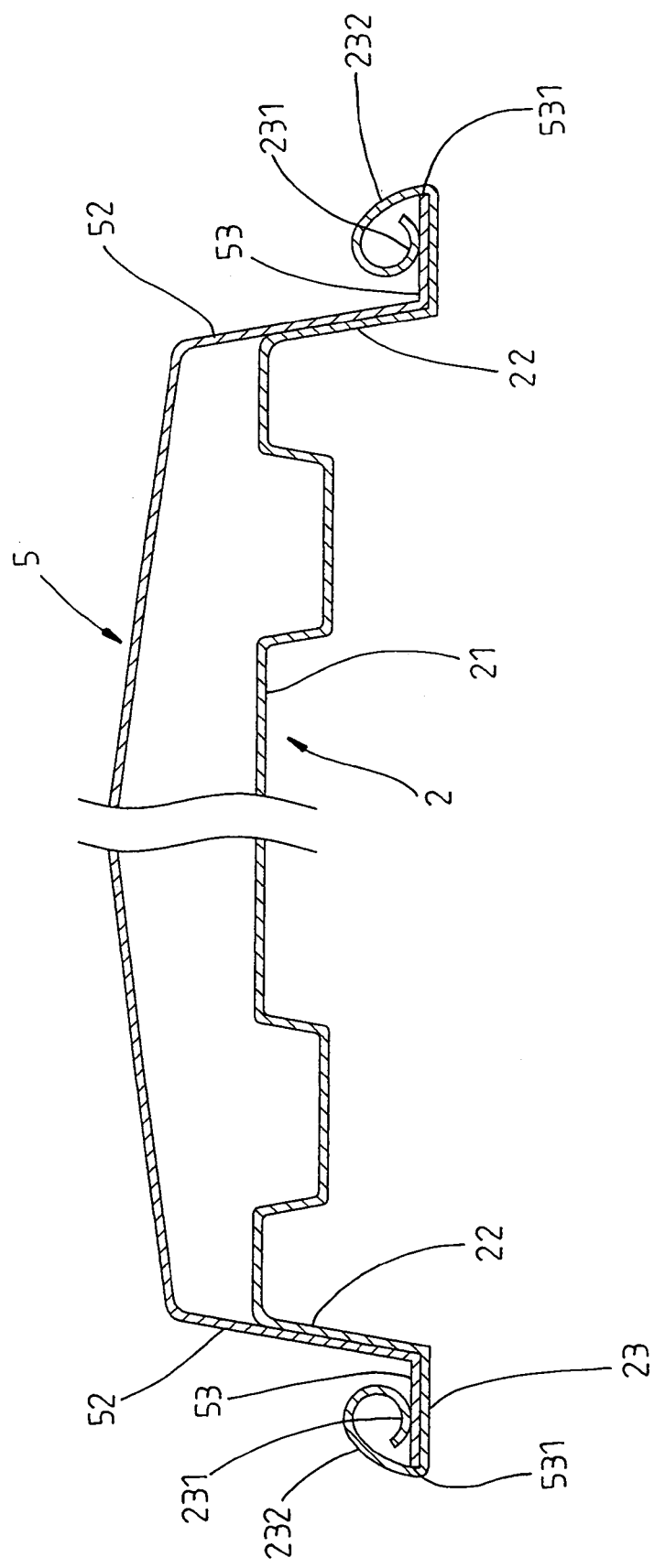
FIG. 14 is similar to FIG. 13 but showing the status of the rim of the back panel after processed through the third roller ramming mechanism.

Referring to FIGS. 7~15, a reflecting mirror fabrication method in accordance with the present invention includes the steps of:

(i) back panel formation 1 where a steel plate 11 is fed into a hydraulic press 12 and stamped by the hydraulic press 12 into a back panel 2 (see FIG. 8) subject to a predetermined pattern, which back panel 2 comprising a base 21, a plurality of reinforcing ribs 211 and 212 formed on the base 21, a rim 23 extending around the base 21, and an annular step 22 extending around the base 21 and connected between the base 21 and the rim 23;

(ii) nut mounting process 3 where a plurality of screw nuts 24 are fixedly fastened to the back side of the base 21 at predetermined locations by spot welding (see FIG. 9);

(iii) mirror formation 4 where a steel plate 41 is fed into a hydraulic press 42 and stamped into a mirror 5, which has a diameter relatively smaller than the back panel 2, a rounded base 51, a rim 53, which extends around the rounded base 51 and has an area relatively smaller than the rim 23 of the back panel 2, and an annular step 52 extending around the rounded base 51 and connected between the rounded base 51 and the rim 531 (see FIG. 10);

(iv) roller ramming process 6 to join the back panel 2 and the mirror 5 into the finished product 60.

Figure 15:
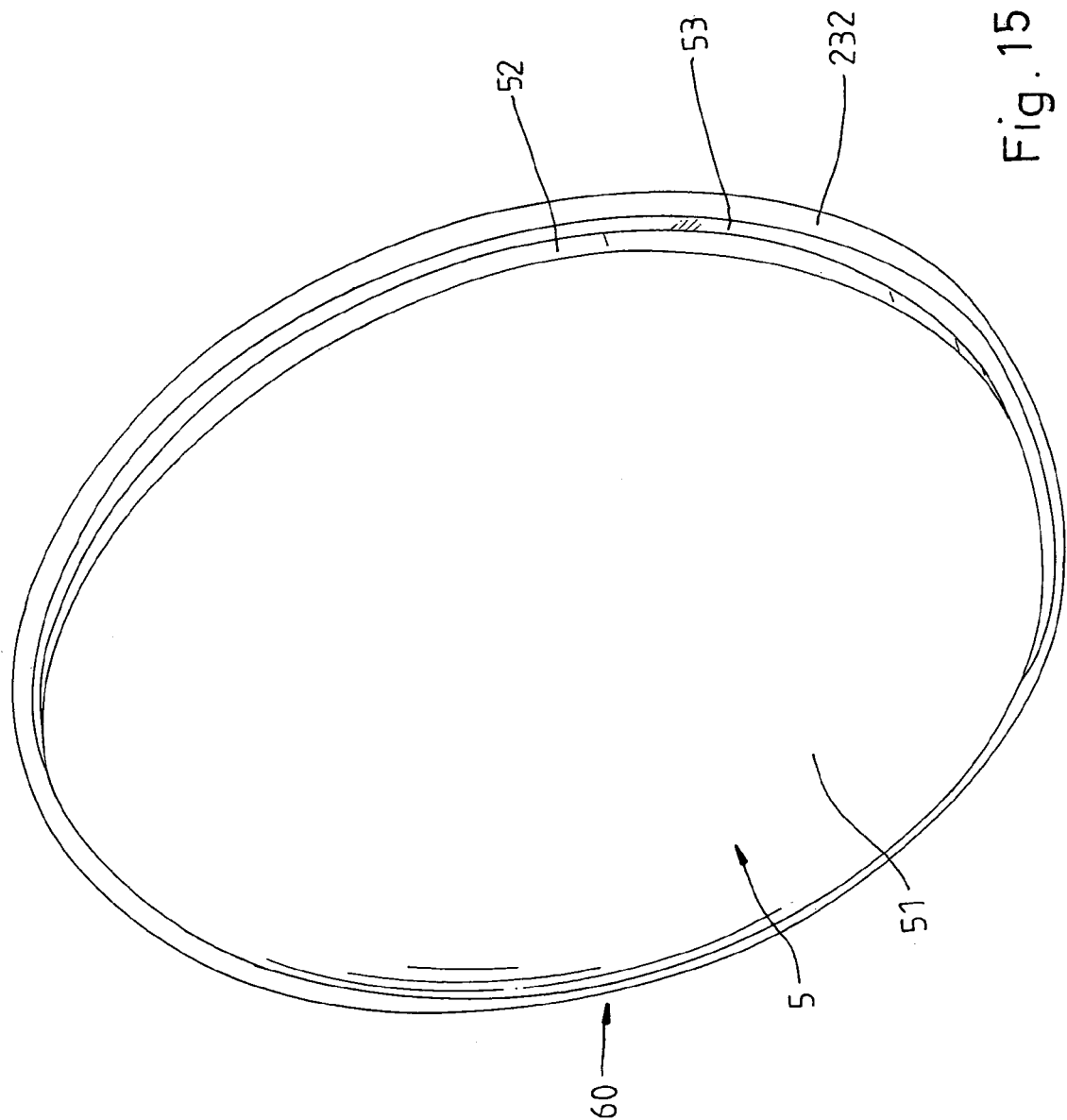
FIG. 15 is an elevational view of a finished reflecting mirror according to the present invention.
Figure 16:
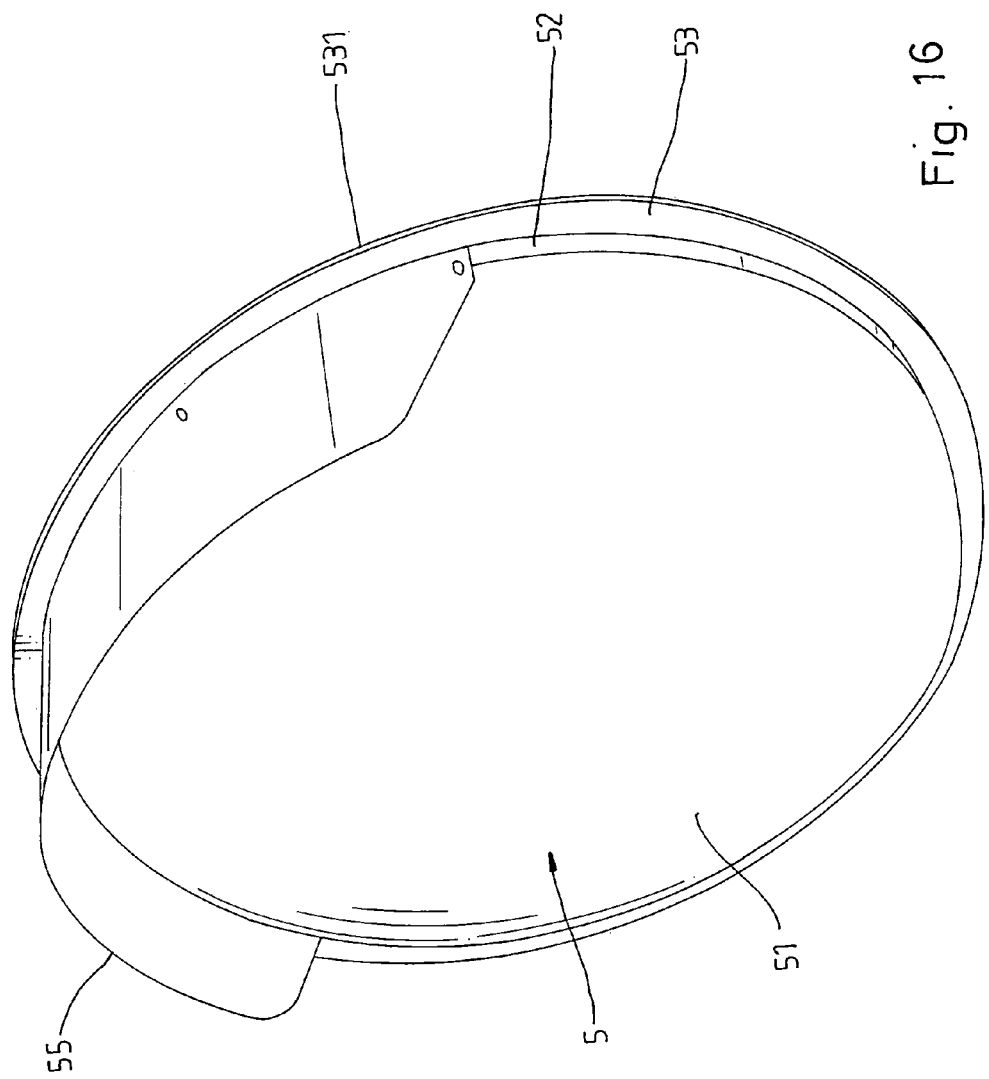
FIG. 16 is an elevational view showing a visor fixedly fastened to the mirror according to the present invention.
Figure 17:
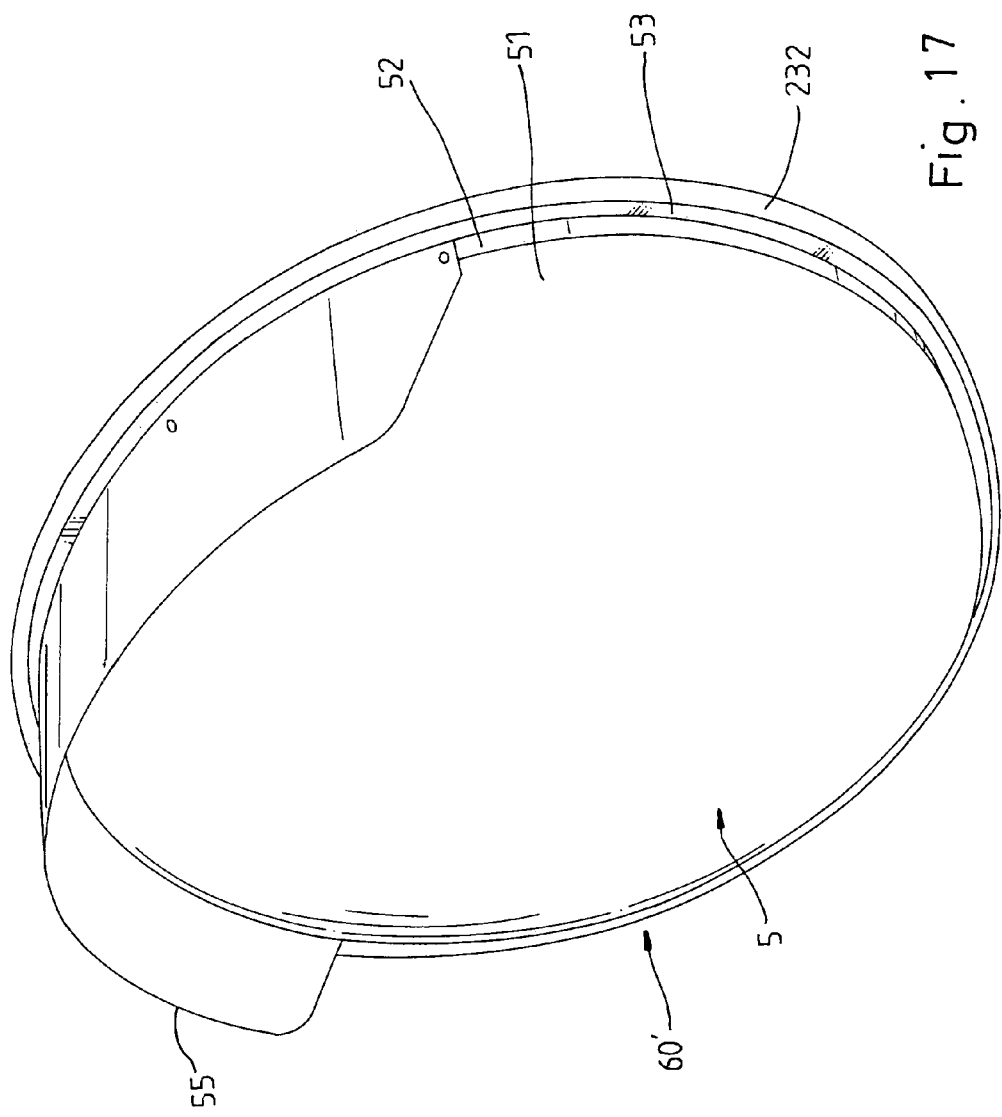
FIG. 17 is an elevational view of a finished reflecting mirror with a visor according to the present invention.

During the aforesaid roller ramming process 6, the back panel 2 and the mirror 5 thus obtained are respectively put in the bottom die and upper die of a hydraulic roller ramming machine (not shown), and then controlling the roller ramming machine to move the upper die toward the bottom die and to further engage the annular step 22 of the back panel 2 into the annular step 52 of the mirror 5 and stop the rim 23 of the back panel 2 against the rim 53 of the mirror 5 (see FIG. 11), and then controlling the roller ramming machine to move a first roller ramming mechanism (not shown) against the rim 23 of the back panel 2 and to further bend the outer part of the rim 23 into an angled flange (see FIG. 12), and then controlling the roller ramming machine to move a second roller ramming mechanism (not shown) against the angled flange of the rim 23 and to further curve the angled flange of the rim 23 into a scrolled holding down rim portion (see FIG. 13), and then controlling the roller ramming machine to move a third roller ramming mechanism (not shown) against the scrolled holding down rim portion of the rim 23 to further force the scrolled holding down rim portion of the rim 23 over the peripheral edge 531 of the rim 53 of the mirror 5, enabling the inner side 231 of the scrolled holding down rim portion 232 of the rim 23 of the back panel 2 to be pressed on the rim 53 of the mirror 5 against the inner part of the rim 23 of the back panel 2 (see FIGS. 14 and 15), and therefore the mirror 5 and the back panel 2 are fixedly fastened together, forming the desired finished reflecting mirror 60 (see FIG. 15). By means of the screw nuts 24 at the back side of the back panel 2, the reflecting mirror 60 can be conveniently fastened to a bracket at the wall, post or column of a supermarket, shop or parking lot (not shown) to reflect the image of the road or the intersection between two rods.

Further, a visor 55 may be welded or riveted to the annular step 52 of the mirror 5 after step (iii) mirror formation 4 before step iv) roller ramming process 6.

Further, the rim 23 of the back panel 2 and the rim 53 of the mirror 5 may be polished to remove furs before step iv) roller ramming process (6).

Figure 18:
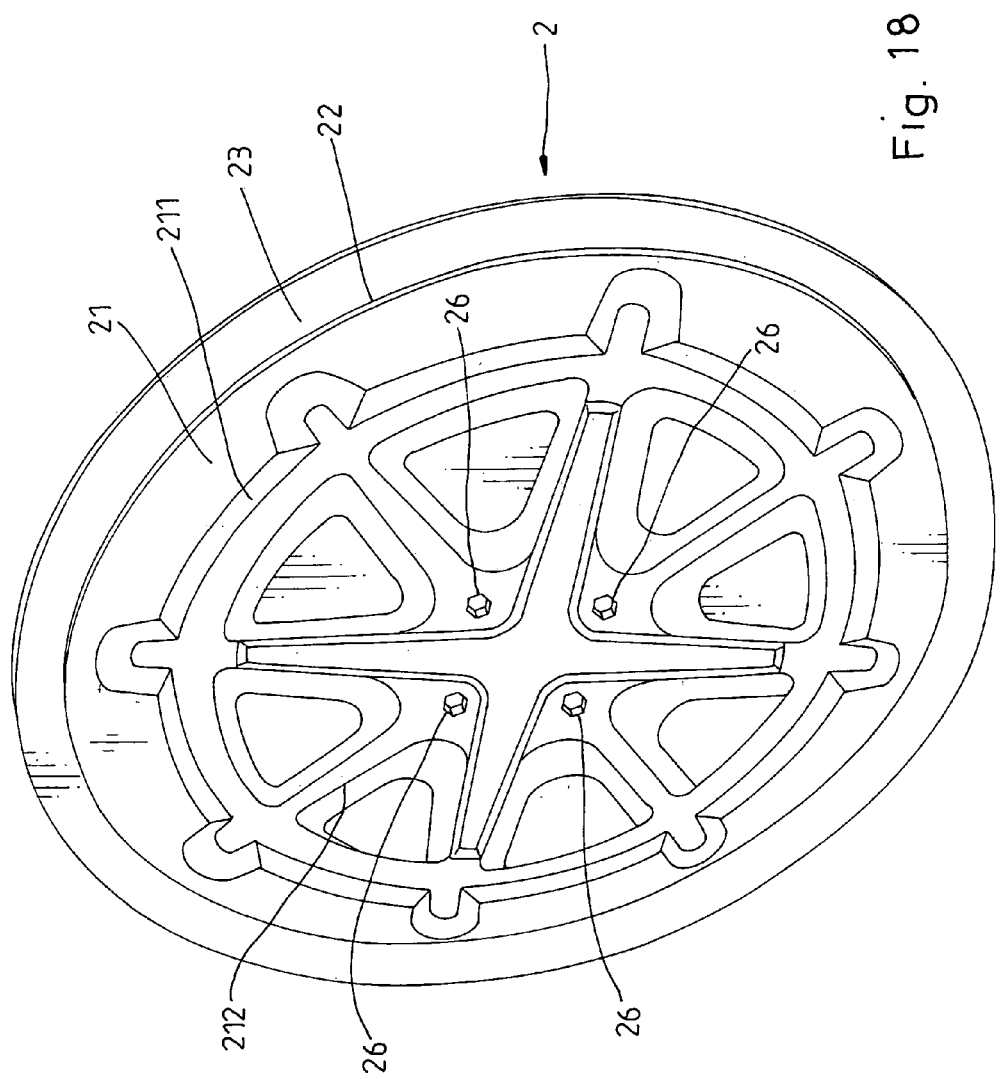
FIG. 18 is an elevational view of a back panel with mounting through holes made according to the reflecting mirror fabrication method according to the present invention.
Figure 19:
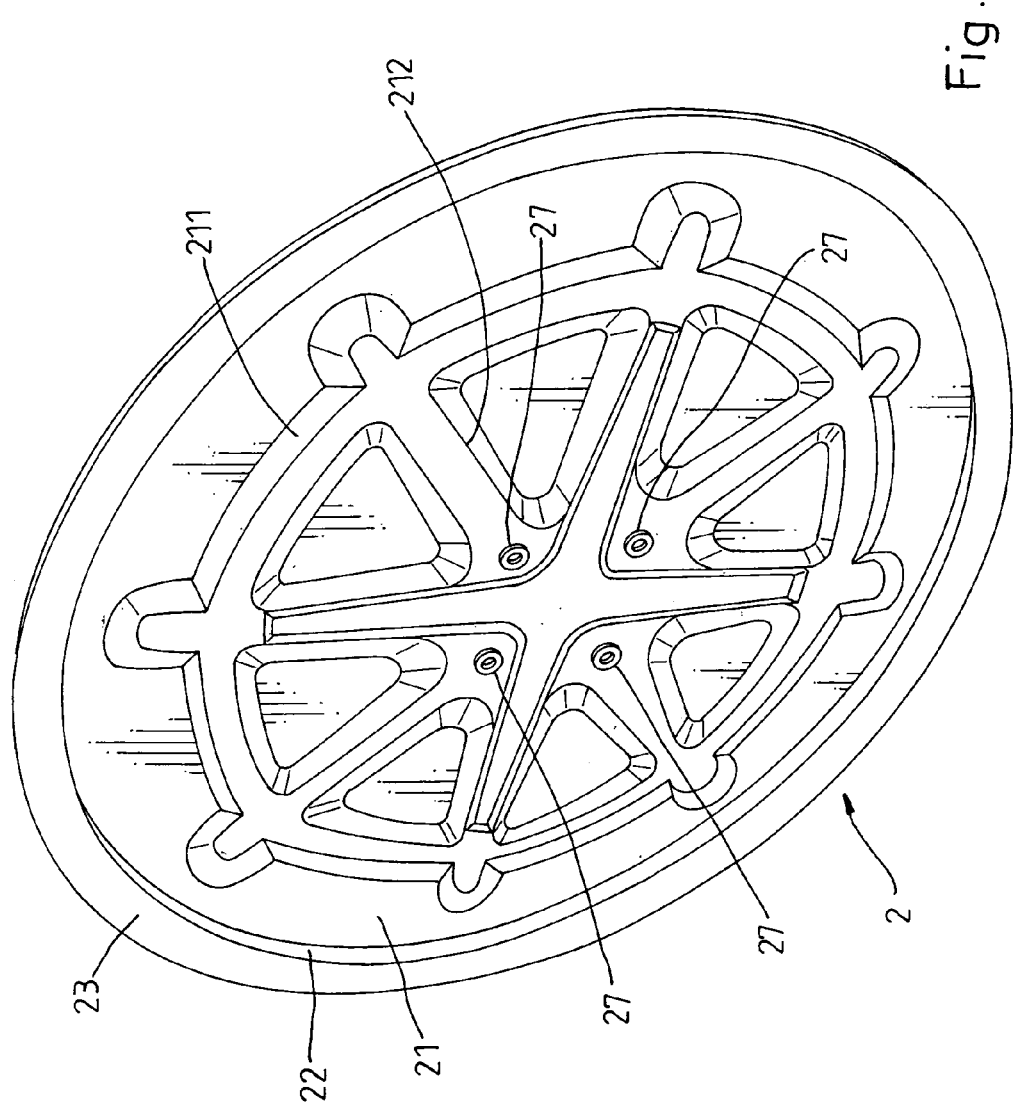
FIG. 19 corresponds to FIG. 18, showing rivet nuts fastened to the mounting through holes of the back panel according to the present invention.

Further, as an alternate form of the present invention, the back panel 2 is made having mounting through holes 26 (see FIG. 18) during step (i) back panel formation 1, and a rivet nut mounting process of fixedly fastening respective rivet nuts 27 to the mounting through holes 26 of the back panel 2 is employed to substitute the aforesaid step (ii) screw nut joining 3 (see FIG. 19).

Further, the steel plate 11 used in step (i) back panel formation (1) can be a painted steel plate, stainless steel plate or galvanized steel plate.

Further, the steel plate 41 used in step (iii) mirror formation 4 is a stainless steel plate.

As indicated above, the reflecting mirror fabrication method of the present invention has the following characteristics:

1. The outer part of the rim 23 of the back panel 2 is processed through a roller ramming machine into a scrolled holding down rim portion 232 that holds down the rim 53 of the mirror 5 on the rim 23 of the back panel 2. The smoothly curved scrolled holding down rim portion 232 of the rim 23 of the back panel 2 causes a sense of beauty and does not hurt any person who touches the border edge of the reflecting mirror accidentally.

2. Because no packing ring is needed to protect the connection area between the back panel and the mirror, the fabrication process of the invention saves much labor and time.

3. The back panel 2 and the mirror 5 are fastened together through a roller ramming process without welding, thereby lowering the chance of pollution. Further, because the invention eliminates the use of a polyvinyl chloride packing ring, the fabrication of the reflecting mirror meets environment protection principle.

Although a particular embodiment of the present invention has been described in detailed for purposes of illustration, various modifications and enhancements may be made without departing from the spirit and scope of the invention. Accordingly, the invention is not to be limited except as by the appended claims.

What is claimed is:

1. A reflecting mirror fabrication method comprising the steps of:
   a) back panel formation where a steel plate is fed into a hydraulic press and stamped by the hydraulic press into a back panel, which comprises a base, a plurality of reinforcing ribs formed on the base, a rim extending around the base, and an annular step extending around the base and connected between the base and the rim;
   b) nut mounting process where a plurality of nuts are fixedly fastened to a back side of the base of said back panel at predetermined locations;
   c) mirror formation where a steel plate is fed into a hydraulic press and stamped into a mirror, which has a diameter relatively smaller than said back panel, a rounded base, a rim, which extends around the rounded base and has an area relatively smaller than the rim of said back panel, and an annular step extending around the rounded base and connected between the rounded base and the rim of said mirror; and
   d) roller ramming process to join said back panel and said mirror into the finished product by: putting said back panel and said mirror in a bottom die and upper die of a hydraulic roller ramming machine respectively, and then controlling said roller ramming machine to move said upper die toward said bottom die and to further engage the annular step of said back panel into the annular step of said mirror and stop the rim of said back panel against the rim of said mirror and then controlling said roller ramming machine to move a first roller ramming mechanism against the rim of said back panel and to further bend an outer part of the rim of said back panel into an angled flange, and then controlling said roller ramming machine to move a second roller ramming mechanism against said angled flange and to further curve said angled flange into a scrolled holding down rim portion, and then controlling said roller ramming machine to move a third roller ramming mechanism against said scrolled holding down rim portion to further force said scrolled holding down rim portion over the peripheral edge of the rim of said mirror for enabling an inner side of said scrolled holding down rim portion of said back panel to be pressed on the rim of said mirror against an inner part of the rim of said back panel so as to keep said mirror and said back panel fixedly fastened together.

2. The reflecting mirror fabrication method as claimed in claim 1, further comprising a sub-step of fastening a visor to the annular step of said mirror after step c) mirror formation and before step d) roller ramming process.

3. The reflecting mirror fabrication method as claimed in claim 1, further comprising a sub-step of polishing the rim of said back panel and the rim of said mirror to remove burrs from said back panel and said mirror before step d) roller ramming process.

4. The reflecting mirror fabrication method as claimed in claim 1, wherein said back panel thus formed during step a) has a plurality of through holes disposed at predetermined locations; said step b) nut mounting process is to fixedly fasten a plurality of rivet nuts to the through holes of said back panel.

5. The reflecting mirror fabrication method as claimed in claim 1, wherein the steel plate used in step a) back panel formation is selected from one of the steel materials of painted steel plate, stainless steel plate and galvanized steel plate.

6. The reflecting mirror fabrication method as claimed in claim 1, wherein the steel plate used in step c) mirror formation is a stainless steel plate.

7. A reflecting mirror made according to claim 1.

* * * * *